United States Patent
Bakshi et al.

(10) Patent No.: US 6,772,200 B1
(45) Date of Patent: Aug. 3, 2004

(54) SYSTEM FOR PROVIDING NON-INTRUSIVE DYNAMIC CONTENT TO A CLIENT DEVICE

(75) Inventors: Bikram Singh Bakshi, Hillsboro, OR (US); Robert Conrad Knauerhase, Portland, OR (US); Michael Man-Hak Tso, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 999 days.

(21) Appl. No.: 09/000,760

(22) Filed: Dec. 30, 1997

Related U.S. Application Data

(60) Provisional application No. 60/046,592, filed on May 15, 1997.

(51) Int. Cl.[7] .............................................. G06F 15/16
(52) U.S. Cl. ....................................................... 709/217
(58) Field of Search ................................ 709/223, 224, 709/227, 248, 218, 217, 219; 705/14, 26, 30

(56) References Cited

U.S. PATENT DOCUMENTS

| | | | |
|---|---|---|---|
| 5,373,375 A | 12/1994 | Weldy | 358/523 |
| 5,517,612 A | 5/1996 | Dwin et al. | 395/166 |
| 5,544,320 A | 8/1996 | Konrad | 395/200.09 |
| 5,673,322 A | 9/1997 | Pepe et al. | 380/49 |
| 5,684,969 A | 11/1997 | Ishida | 395/342 |
| 5,701,451 A | 12/1997 | Rogers et al. | 395/600 |
| 5,706,434 A | 1/1998 | Kremen et al. | 395/200.09 |
| 5,724,556 A | 3/1998 | Souder et al. | 395/500 |
| 5,727,159 A | 3/1998 | Kikinis | 395/200.76 |
| 5,740,549 A * | 4/1998 | Reilly et al. | 705/14 |
| 5,742,905 A | 4/1998 | Pepe et al. | 455/461 |
| 5,768,510 A | 6/1998 | Gish | 395/200.33 |
| 5,796,952 A * | 8/1998 | Davis et al. | 709/224 |
| 5,805,735 A | 9/1998 | Chen et al. | 382/239 |
| 5,809,242 A * | 9/1998 | Shaw et al. | 709/217 |
| 5,848,397 A * | 12/1998 | Marsh et al. | 705/14 |
| 5,854,897 A * | 12/1998 | Radziewicz et al. | 709/224 |
| 5,878,421 A * | 3/1999 | Ferrel et al. | 707/100 |
| 5,893,114 A * | 4/1999 | Hashimoto et al. | |
| 5,901,287 A * | 5/1999 | Bull et al. | 709/218 |
| 5,918,014 A * | 6/1999 | Robinson | 709/218 |
| 5,940,820 A * | 8/1999 | Kagiwada | |
| 5,974,394 A * | 10/1999 | Nakayama et al. | |
| 6,008,803 A * | 12/1999 | Rowe et al. | |

\* cited by examiner

Primary Examiner—Marc D. Thompson
(74) Attorney, Agent, or Firm—Kenyon & Kenyon

(57) ABSTRACT

A system for presenting dynamic content to a user of a client device in a non-intrusive manner is implemented in a method including the steps of retrieving dynamic content to be presented to a user, and presenting the dynamic content to the user at a time selected in accordance with a predetermined condition.

21 Claims, 6 Drawing Sheets

SYSTEM FOR PROVIDING NON-INTRUSIVE DYNAMIC CONTENT TO A CLIENT DEVICE

This application claims the benefit of the identically-titled U.S. Provisional Application No. 60/046,592, filed May 15, 1997 by Bikram S. Bakshi et al. and assigned to Intel Corporation, the disclosure of which is expressly incorporated herein by reference.

BACKGROUND OF THE INVENTION

1. Field of the Invention

The present invention relates generally to the field of data communications for personal computers (PCs), and in particular to a system for delivering dynamic content, such as targeted on-line advertising, to a client device in a relatively non-intrusive manner.

2. Related Art

The Internet is quickly becoming the preferred data communications medium for a broad class of computer users ranging from private individuals to large multi-national corporations. Such users now routinely employ the Internet to access information, distribute information, correspond electronically, and even conduct personal conferencing. An ever-growing number of individuals, organizations and businesses have established a presence on the Internet through "Web pages" on the World-Wide Web (WWW).

As the popularity of the Internet has grown, so too have opportunities for on-line marketing. Advertising through the Internet has become enormously popular. Indeed, in some cases on-line services like e-mail are provided free of charge as long as users are willing to receive on-line advertisements.

On-line advertisements are typically included as an integral part of the content on Web pages. This approach suffers from a variety of limitations. For example, users tend to follow hyperlinks and move from one Web page to another, much like "surfing" the channels on a television. Such user behavior tends to reduce the impact of advertising, as advertisements generally are more effective with captive audiences. Even when a user views a Web page containing advertising content for a significant period of time, however, the content being viewed and the advertisements compete for a user's attention. In many cases, these unwelcome disruptions lead users to reject on-line advertising altogether.

Accordingly, there is a need for a system capable of distributing dynamic content, such as advertising, to a network user in a manner which limits the extent to which such dynamic content competes with other content for the user's attention.

SUMMARY OF THE INVENTION

According to an embodiment of the present invention, a method for presenting dynamic content to a user of a client device is provided. The method includes retrieving dynamic content to be presented to a user, and presenting the dynamic content to the user at a time selected in accordance with a predetermined condition.

DETAILED DESCRIPTION

Embodiments of the present invention provide a system for the presentation of dynamic content to network users in a less intrusive manner than is possible with existing technology. The dynamic content may comprise advertising information; however, the scope of the present invention is not limited in this respect. The embodiments described herein may be readily applied to the provision of any type of content which is to be displayed in conjunction with data being displayed in response to a user request. Such dynamic content is presented at a time determined in accordance with a predetermined condition, such as the existence of an open connection between a client device and a network device, or at predetermined periodic intervals.

Figure 1:
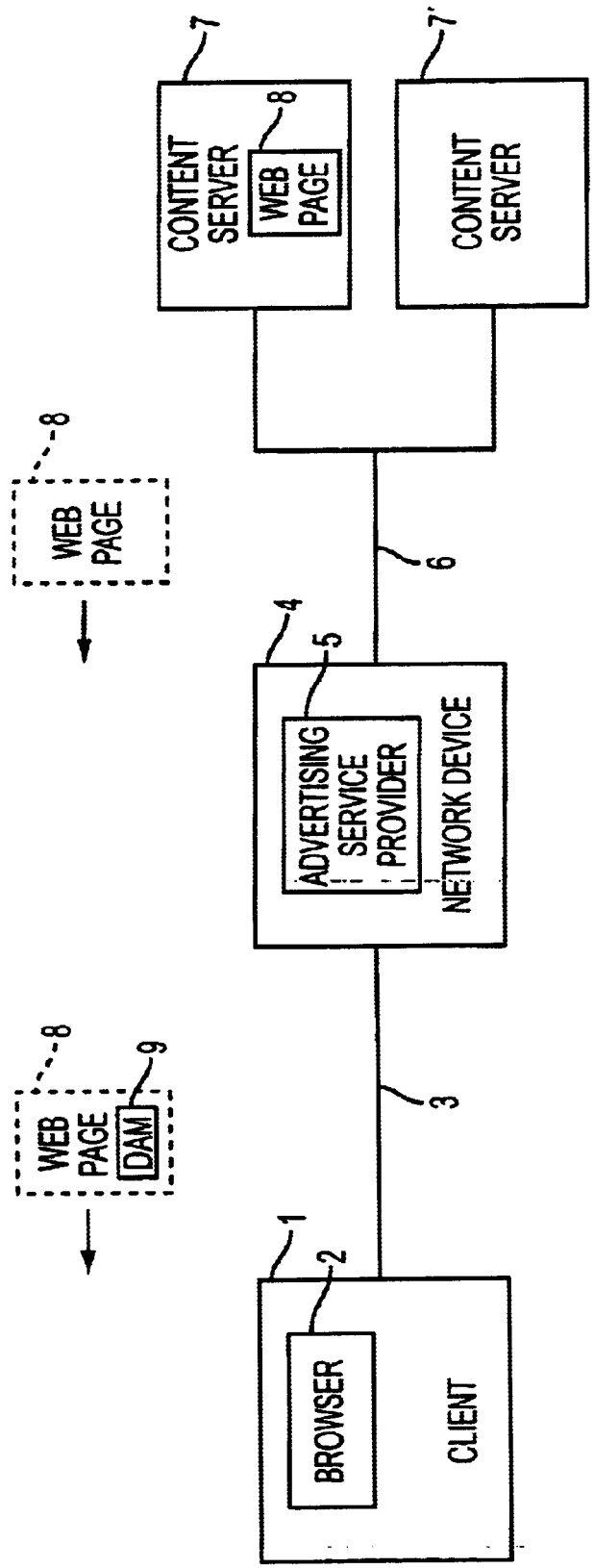
FIG. 1 is a schematic diagram illustrating a system for distribution of dynamic content according to an embodiment of the present invention.

According to a first embodiment of the present invention, illustrated in FIG. 1, a client device 1 may access a plurality of content servers 7 through a network device 4. Client device 1 may include a browser 2, such as Netscape Navigator™, which enables a user of client device 1 to retrieve and display network data objects, such as Web pages resident on content server 7. It should be noted, however, that client device 1 may alternatively include any other suitable browser. Content server 7 may reside, for example, on the Internet and be accessible through standard HTTP (HyperText Transfer Protocol) messages; however, the present invention is not limited to any particular network or communications method. In this particular embodiment, network device 4 is a network proxy. Alternatively, network device 4 may comprise a network server, a content server, or some other type of stand-alone computer or distributed system of computers coupled, for example, to an ISP's (Internet Service Provider's) network, a corporate network, or anywhere on the Internet. Although FIG. 1 illustrates only a single client device 1, network device 4 will typically be configured to provide multiple client devices with access to network resources.

Network device 4 includes an advertising service provider 5 to manage the provision of dynamic content to client device 1. In this particular embodiment, advertising service provider 5 distributes advertising content to client device 1 by embedding a dynamic advertising module (DAM) 9 into one or more Web pages 8 downloaded to client device 1. Advertising service provider 5 may comprise a software module installed in, or otherwise executable by, network device 4. Dynamic advertising module 9 may comprise a dynamic executable module of a type known in the art implemented, for example, using a Java applet or similar utility, which automatically executes upon being loaded onto client device 1.

Dynamic advertising module 9 is programmed to control the display of advertising content on client device 1 in cooperation with advertising service provider 5. In general, dynamic advertising module 9 monitors communications link 3 to detect the existence of an open connection(s) between client device 1 and network device 4, which suggests that client device 1 is waiting for requested content to be downloaded. Such monitoring may be accomplished, for example, by transmitting an appropriately-congfigured HTTP "POST" message to network device 4 requesting status information from advertising service provider 5. Dynamic advertising module 9 may be configured to transmit such requests for connection status on a predetermined periodic basis. If an open connection(s) is detected, advertising service provider 5 may be programmed to respond to the "POST" message by informing dynamic advertising module 9 of the number of bytes still to be served on the open connection(s). The determination of such information is well known in the art.

Based on the information provided in the response to the "POST" message, dynamic advertising module 9 may calculate a period of time likely required to complete the pending download. Alternatively, advertising service provider 5 may include an estimate of the time remaining in its response. In either case, dynamic advertising module 9 may then initiate presentation of dynamic content on client device 1 for a duration equal to, or less than, that calculated time. The dynamic content provided by dynamic advertising module 9 may already be resident on client device 1 (for example, in a local cache storage or other memory accessible by dynamic advertising module 9), although dynamic advertising module 9 may be programmed to retrieve such dynamic content from some other location. In effect, this embodiment of the present invention provides an "advertisements while you wait" model that is less disruptive to the user's browsing session.

Figure 2:
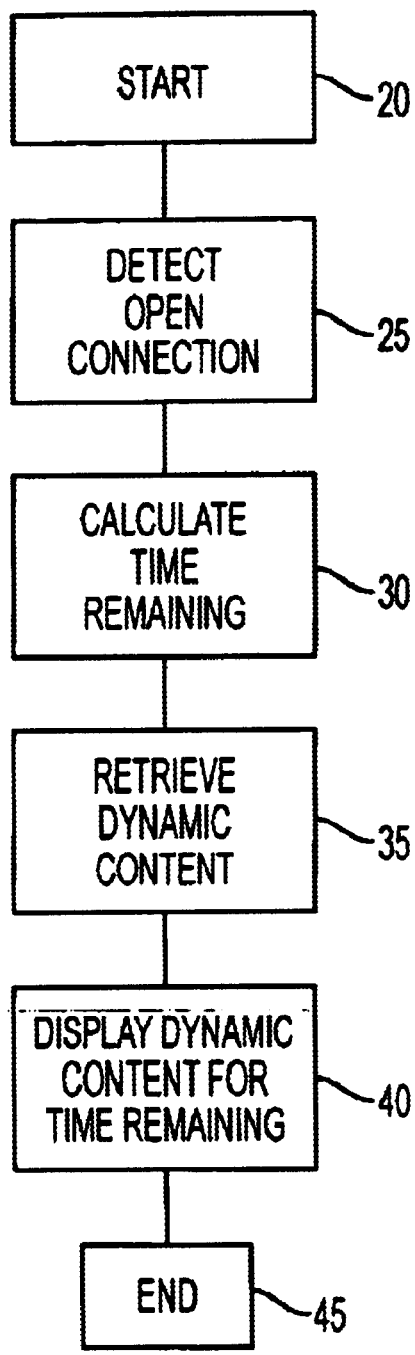
FIG. 2 is a flow diagram illustrating a method for distribution of dynamic content according to an embodiment of the present invention.

By way of further illustration, FIG. 2 provides a flow diagram for a method of distributing dynamic content in a non-intrusive manner according to an embodiment of the present invention. The illustrated method may be implemented, for example, using the system illustrated in FIG. 1. Referring now to FIG. 2, the method begins with detection of an open connection between client device 1 and network device 4 (Step 25). Next, an estimated time period over which the connection is expected to remain open is calculated (Step 30). Assuming this is more than a negligible period of time, dynamic content is retrieved from, for example, a local cache storage of client device 1 (Step 35). The retrieved dynamic content is then displayed on client device 1 for a time period that, in one embodiment, is no longer than the previously-calculated time remaining for the open connection (Step 40).

According to a variation of this embodiment, the user may be provided with the ability to access additional information about an advertisement or its source, in which case the duration of the advertisement may be suitably extended by, for example, redirecting the user's browser to the advertiser's Web site and/or downloading an extended/longer version of the advertisement.

According to an alternate embodiment of the present invention, which may also be implemented using the system illustrated in FIG. 1, dynamic content may be periodically displayed on client device 1 for predetermined periods of time in the manner of a television commercial break. Although somewhat more intrusive than the foregoing embodiments, this approach still improves over existing on-line advertising techniques because there is not regular competition for the user's attention between advertising content and requested content. This latter embodiment also reduces or eliminates client device 1 monitoring connections to network device 4.

Figure 5:
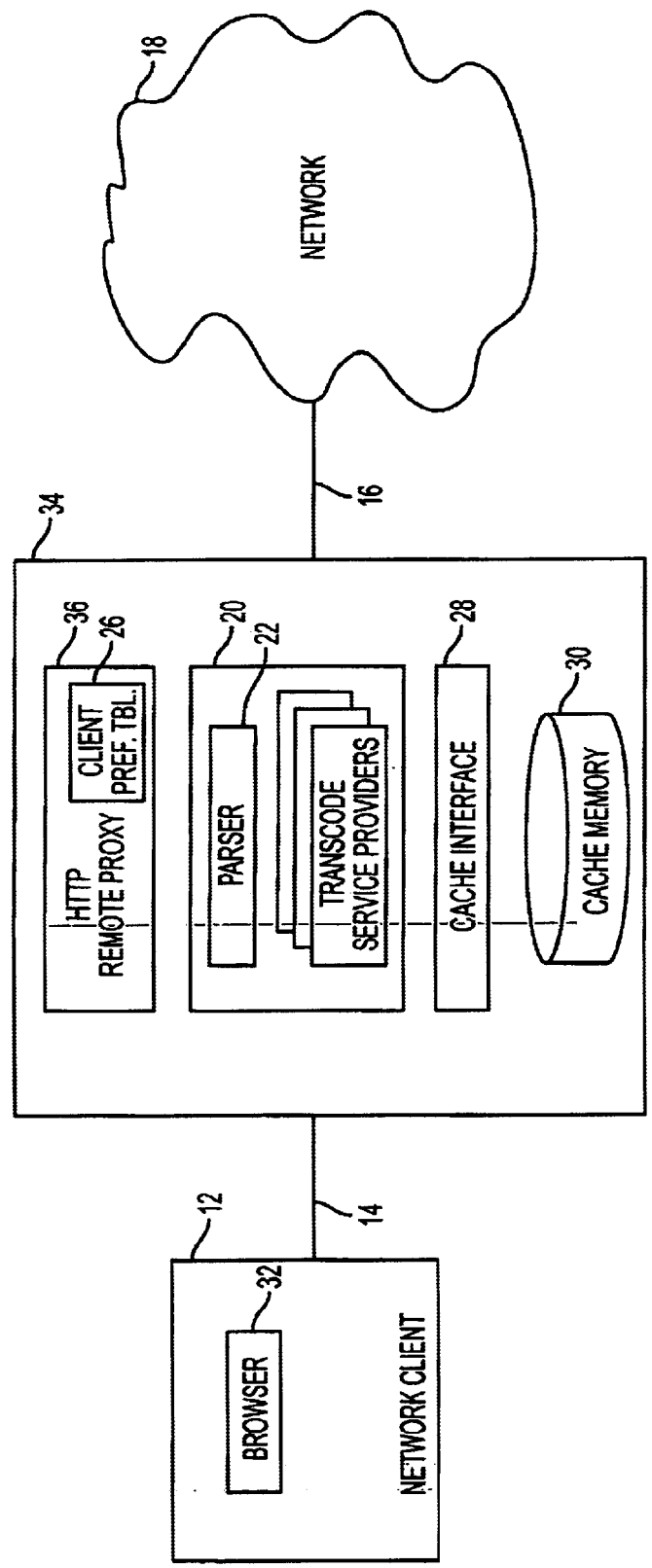
FIG. 5 is a schematic diagram illustrating a system for providing dynamic content to a so-called non-enabled client device in accordance with an embodiment of the present invention.

By way of further illustration, the foregoing embodiments may be implemented in a system such as that shown in FIG. 5. In that system, network client 12 communicates with an external network 18 through a transcoding server 34. Network client 12 includes a browser 32, such as the Netscape Navigator v.3.0 browser (although the invention is not limited in this respect), which manages the presentation of data to a user. In the illustrated embodiment, network client 12 is "non-enabled," meaning no specialized transcoding software is preloaded on network client 12. Network 18 may comprise, for example, the Internet. In this particular arrangement, network client 12 communicates requests for information to, and receives information from, transcoding server 34 over a client/server communications link 14. Transcoding server 34 in turn communicates with computers resident on network 18 through server/network communications link 16. The respective communications links 14, 16 may comprise any suitable communications media known in the art.

Transcoding server 34 may be configured to provide a wide variety of transcoding services to network client 12 and/or network devices, such as content servers, with which network client 12 communicates. In this context, the term "transcode" refers to virtually any type of addition, deletion or modification of data transmitted to or from network client 12 by or through transcoding server 34. Examples of such transcoding services include data compression, image scaling, and dynamic removal of predetermined content. In the context of the present invention, the provision of non-intrusive dynamic content may be the only transcoding service provided to a particular client device, or may be only one of a variety of services.

As illustrated in FIG. 5, transcoding server 34 may include a transcoder 20 with a in parser 22 and a plurality of transcode service providers 24. Parser 22 is configured to act upon data received by transcoder 20, such as a request for a network object generated by client device 12 or a reply to such a request provided by a content server or other device on network 18. In this particular example, parser 22 selectively invokes one or more of transcode service providers 24 based upon a predetermined selection criterion. With reference to FIG. 1, advertising service provider 5 may be implemented, for example, as a transcoding service provider 24.

In the arrangement shown in FIG. 5, transcoding server 34 includes an HTTP (HyperText Transfer Protocol) remote proxy 36, capable of accessing network 18 over server/network communications link 16. HTTP remote proxy 36 provides functionality different from known network proxies, which generally are little more than a conduit for requests to, and replies from, external Internet resources, in that it is capable not only of examining such requests and replies, but also of acting upon commands in the requests by, for example, determining whether or not to transcode content. Moreover, using transcoder 20, HTTP remote proxy 36 is capable of changing content received from network 18 prior to returning it to a requesting network client 12.

Looking more closely at the arrangement shown in FIG. 5, transcoder 20 is coupled to HTTP remote proxy 36. Parser 22 manages the transcoding of data to be transmitted from transcoding server 34 to network client 12. To this end, parser 22 controls transcode service providers 24 to selectively transcode content based on a predetermined selection criterion. For example, one or more transcode service providers 24 may provide the capability to compress and/or scale different types of data content, such as image, video, or HTML (HyperText Markup Language), in addition to providing non-intrusive dynamic content as discussed above. Transcoding server 34 may also include a server-side cache memory 30 managed by a server-side cache interface 28. Server-side cache memory 30 may be used to store both original and transcoded versions of content for later transmission to network client 12 without the need to re-retrieve the content from network 18 or to re-transcode the content.

Parser 22 may comprise a relatively simple, uniform interface to HTTP remote proxy 36, and may provide an API (Application Programming Interface) for transcoding data received by HTTP remote proxy 36. Parser 22 manages one or more transcode service providers 24 that are accessed through a common SPI (Service Provider Interface). In this particular implementation, parser 22 is designed in compliance with the Windows Open Systems Architecture (WOSA), and may be implemented as a Win32 DLL (Dynamic Link Library). The WOSA architecture, described in *Readings on Microsoft Windows and WOSA* (Microsoft Corp. 1995), enables additional transcode service providers 24 to be dynamically added to the system to provide new features and/or better transcoding algorithms, while at the same time not requiring changing or retesting other software components in the system.

Like parser 22, server-side cache interface 28 may be modeled after a standard Get/Set interface. Server-side cache memory 30 essentially "owns" all cached objects, in that it manages the properties and storage of the objects and may invalidate any non-locked object at any time; however, the actual format of any given cached object is known only by parser 22 and its associated transcode service providers 24. Thus, for data integrity and transcoding efficiency purposes, all access to server-side cache memory 30 in this arrangement is through parser 22 in this embodiment.

In operation, transcoder 20 may use an HTTP Read( ) call to read data from a specified cached object data stream. For example, transcode service provider 24 may invoke this call and tunnel stream data through HTTP remote proxy 36 directly to network client 12. Similarly, an HTTP Write( ) call may be used to cache data from a new HTTP data stream. This call will append an incoming data stream received from, for example, a Web server or transcode service provider 24, to an opened cache stream which may be concurrently read using the Read( ) call.

In this embodiment, parser 22 may be configured to include the following calls:

GetObject(URL, InParams, &OutParams, &OutStream, . . . );

GetScaledObject(URL, InParams, &OutParams, &OutStream, Stage, . . . );

PutObject(URL, InParamStruct, &InStream, &OutParams, &OutStream, . . . ).

Parser 22 may use such calls to manage the provision of requested content to network client 12. For example, the GetObject( ) call may be used to service non-enabled client requests, and returns a non-transcoded (original) version of a specified hypertext object. In this arrangement, transcoding server 34 assumes that each HTTP request has a unique thread that may be blocked until the request is satisfied. Accordingly, the GetObject( ) call will block until it either returns the requested data stream or indicates failure with a cause (e.g., object does not exist). This ability to return a so-called standard hypertext object is advantageous for compatibility reasons, enabling embodiments of the present invention to be used with existing browsers that do not include support for certain transcoding functionality (e.g., advanced data compression), and enabling users to selectively retrieve non-transcoded versions.

The GetScaledObject( ) call is similar to GetObject( ), and is also used to request an object from server-side cache memory 30; however, it adds support for requesting a particular version of that object, such as a high-quality rendition. Unlike traditional caching proxies, transcode service providers 24 can use server-side cache memory 30 to store several different versions of an object to support clients with different communications and/or presentation capabilities. Thus, an additional "Stage" parameter may be used to indicate which version of the cached object is to be returned to network client 12. Where transcode service provider 24 is configured to scale network content, it may use this parameter to request a version of a cached object having, for example, a default scaled quality, a refinement to a better-quality version, or the original non-scaled version.

In this particular arrangement, when network client 12 requests a hypertext object, HTTP remote proxy 36 uses either the GetObject( ) or GetScaledObject( ) call (depending on if network client 12 is capable of receiving scaled/transcoded datatypes) to retrieve the hypertext object from parser 22. If the hypertext object is not found, parser 22 uses the CreateEntry( ) call to create an entry (in effect, a placeholder) in server-side cache memory 30 for the new object. The new entry is returned to HTTP remote proxy 36, which requests the hypertext object from network 18. As a data stream for the hypertext object is returned, HTTP remote proxy 36 calls parser 22 using the PutObject( ) call, passing into this call the new entry and the handle to the data stream to be placed into the entry. Parser 22 selects an appropriate transcode service provider 24 based, for example, on the content type of the data stream. In this context, the term content type encompasses a datatype, an HTTP MIME (Multipurpose Internet Mail Extensions) type, a content format, and so on. The selected transcode service provider 24 uses a separate thread to read the incoming data stream, transcode it, and place it within the entry of server-side cache memory 30. The current thread immediately returns to HTTP remote proxy 36, which once again calls GetScaledObject( ) (or GetObject( )). This case will always result in a cache hit. This thread then works simultaneously with the separate thread in the PutObject( ) to tunnel data (either original or transcoded) from transcoding server 34 to network client 12 in this embodiment.

Figure 3:
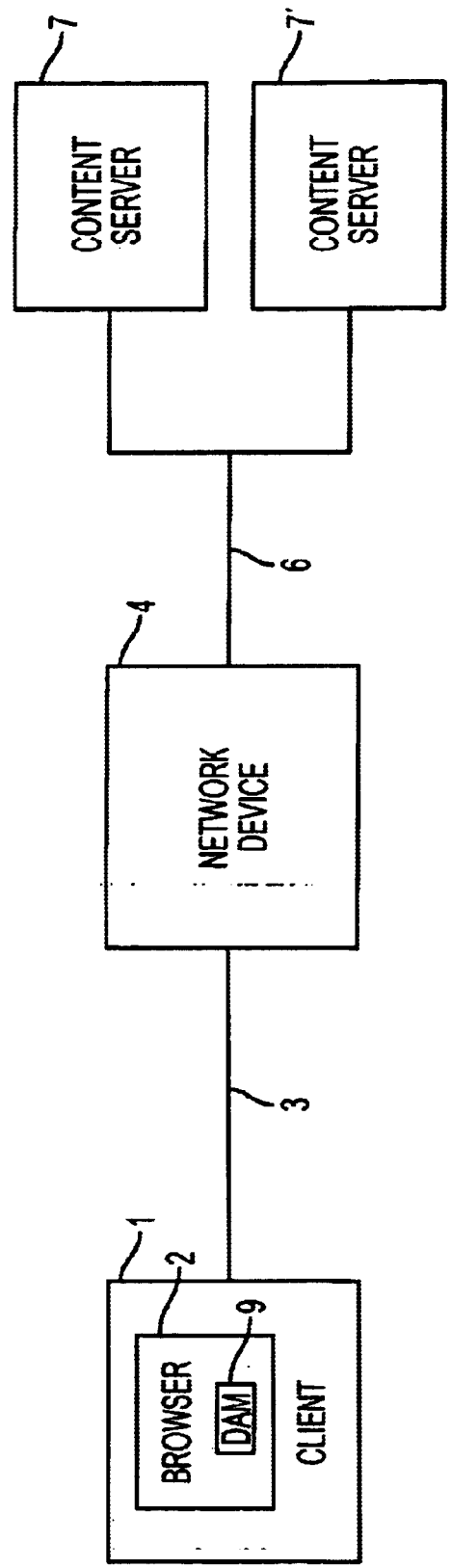
FIG. 3 is a schematic diagram illustrating a system for distribution of dynamic content by a browser according to an embodiment of the present invention.

According to yet another embodiment of the present invention, illustrated in FIG. 3, browser 2 of client device 1 includes a dynamic advertising module 9 which essentially integrates into browser 2 the functionality described above for the DAM of FIG. 1. Dynamic advertising module 9 may be implemented, for example, as a software routine within browser 2, or as a separate executable module which browser 2 may invoke. In this way, browser 2 may be configured to render advertisements as it displays user-requested content. In addition, dynamic advertising module 9 may cause browser 2 to fetch advertisements from one or more network locations. The embodiment of FIG. 3 may be adapted for use according to either the "advertisements while you wait" or the "commercial break" approaches described above.

Figure 4:
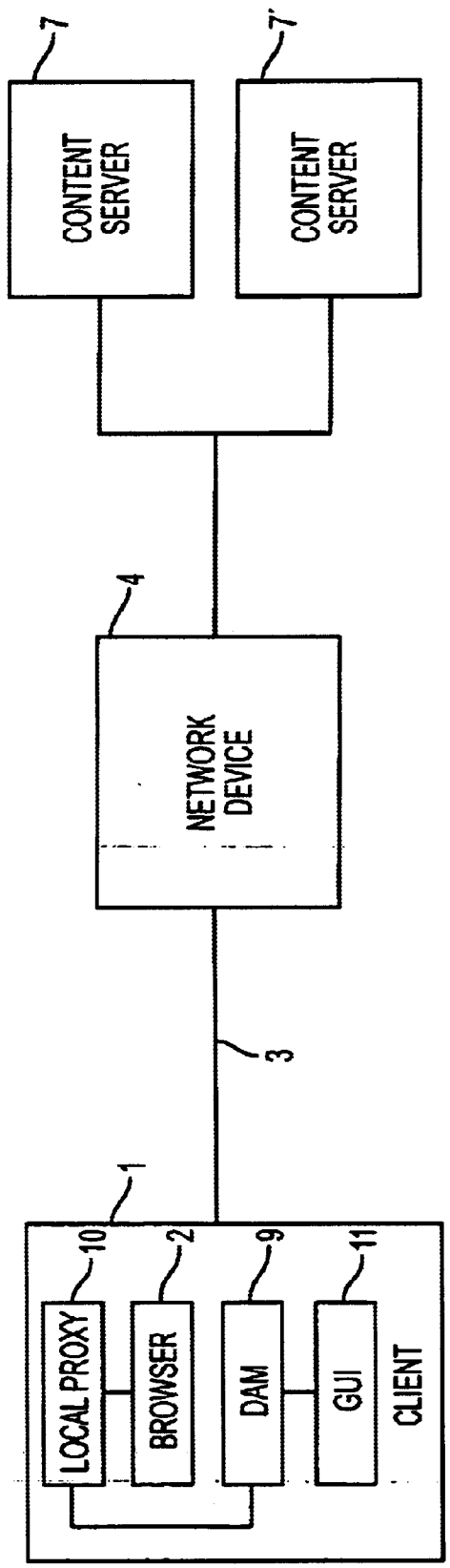
FIG. 4 is a schematic diagram illustrating a system for distribution of dynamic content by a specially-configured client device according to an embodiment of the present invention.

According to yet another embodiment, illustrated in FIG. 4, client device 1 may be a so-called "enabled client," whereby dynamic advertising functionality such as that described above is provided through specialized software installed on client device 1. In this embodiment, client device 1 includes a local proxy 10 coupled to browser 2 which intercepts all network communications to or from client device 1. Client device 1 also includes a dynamic advertising module 9 coupled to a graphical user interface (GUI) 11 capable of displaying so-called "rich" advertisements (that is, high-quality content) represented in datatypes which may not be supported by browser 2. Local proxy 10 is configured to communicate with network device 4 in substantially the same manner as dynamic advertising module 9 of the FIG. 1 embodiment; however, since local proxy 10 intercepts all requests issued by browser 2, a significant portion of the work that network proxy 4 might otherwise perform may be handled at the client-level by local proxy 10 and/or dynamic advertising module 9. Such an approach is especially advantageous where overall system performance may be improved by off-loading work from network proxy 4, such as where network proxy 4 services a large number of client devices. Again, this embodiment may be adapted for use according to either the "advertisements while you wait" or the "commercial break" approaches.

Figure 6:
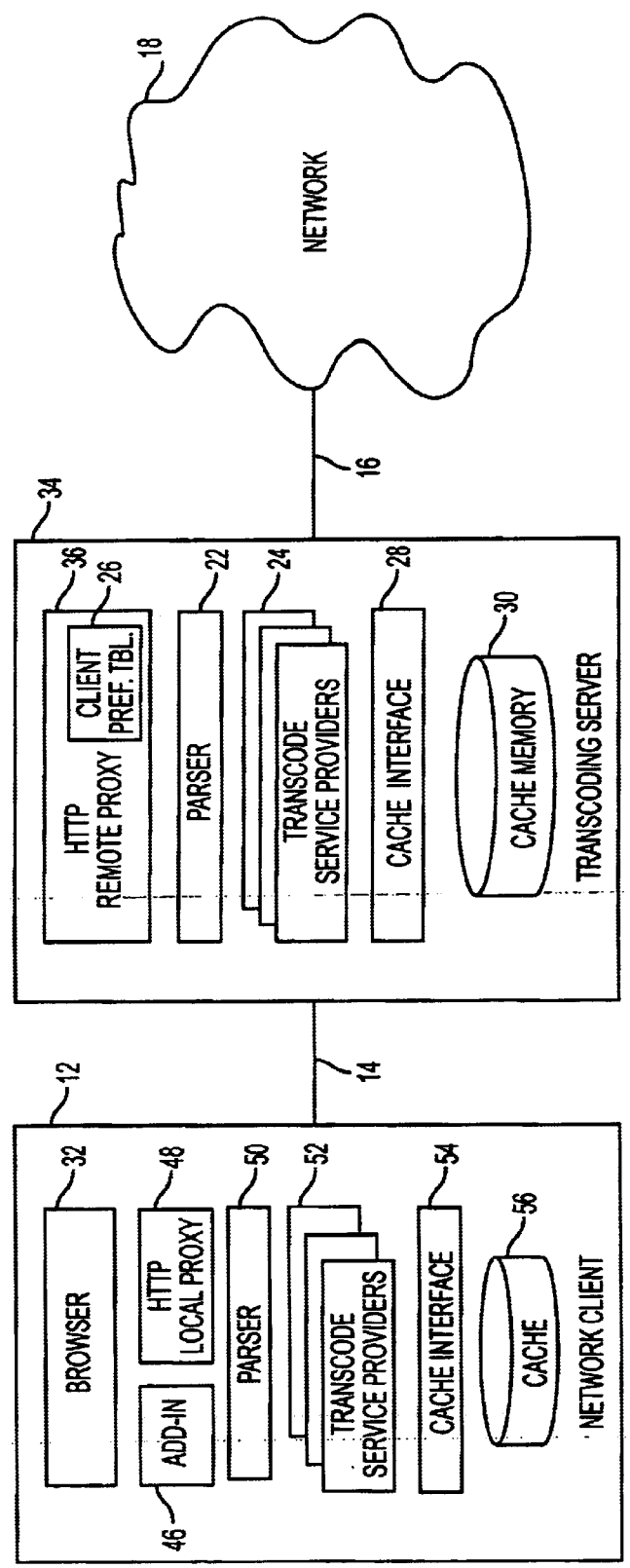
FIG. 6 is a schematic diagram illustrating a system for providing dynamic content to a so-called enabled client device in accordance with an embodiment of the present invention.

The enabled-client embodiment illustrated in FIG. 4 may also be implemented in a system such as that illustrated in FIG. 6. In contrast to the non-enabled client arrangement illustrated in FIG. 5, FIG. 6 shows an arrangement in which an enabled network client 12 communicates with external network 18 through transcoding server 34. As illustrated, network client 12 includes an HTTP local proxy 48 coupled to a client-side parser 50 which, similar to parser 22 of transcoding server 34, controls one or more client-side transcode service providers 52. Each transcode service provider 52 may be configured, for example, to transcode content before it is rendered to a user or to perform a counterpart transcoding function (e.g., decoding, decompression) with respect to a function performed by a corresponding transcode service provider 24 of transcoding server 34. In the context of the present invention, and with further reference to FIG. 4, dynamic advertising module 9 may be implemented, for example, as a client-side transcode service provider 52. As in transcoding server 34, network client 12 may include a client-side cache memory 56 managed by a client-side cache interface 54. Client-side cache interface 54 may be an already-existing facility supported by the operating system, such as WININET. Using an existing caching facility reduces the amount of software that is to be downloaded to network client 12, and also allows other applications, such as disconnected browsers, to share client-side cache memory 56.

HTTP local proxy 48, client-side parser 50 and client-side transcode service providers 52 (collectively, the client software) may be downloaded to network client 12 on demand, such as by clicking on a hypertext link presented by a pop-up window in a manner known in the art. Alternatively, the client software could be distributed to users on a portable storage medium, such as a diskette or CD-ROM, or it may be preloaded on an off-the-shelf personal computer. In the arrangement of FIG. 6, the client software is separate from browser 32; however, in an alternate arrangement (not shown) the client software may be integrated in browser 32.

In the implementation shown in FIG. 4, browser 32 is configured to send all HTTP requests through HTTP local proxy 48, thus allowing HTTP local proxy 48 to improve retrieval and rendering of requested hypertext objects. For example, when HTTP local proxy 48 receives an HTTP request from browser 32 for a hypertext object associated with a Web page, it passes the URL to client-side cache interface 54 to check whether a copy of the hypertext object already exists in client-side cache memory 56. If the hypertext object is cached, HTTP local proxy 48 passes the cached object to browser 32 for rendering. If the requested hypertext object is not cached, HTTP local proxy 48 transmits an HTTP request to transcoding server 34 for processing. HTTP local proxy 48 may use a custom Get( ) request for this purpose to enable transcoding server 34 to identify network client 12 as enabled. Persons skilled in the art will recognize, however, that other forms of requests and/or information passing may readily be used to permit transcoding server 34 to recognize network client 12 as enabled. Performing the processing such as that described above, transcoding server 34 will return a data stream for the hypertext object to HTTP local proxy 48. A client-side transcode service provider 52 may then coordinate the provision of dynamic content, such as advertising, to the user along with the presentation of the requested hypertext object.

Embodiments of the present invention may be distributed, for example, as a set of instructions residing on a storage medium. Such a storage medium might be a memory of a computer; a piece of firmware; a portable storage device, such as a diskette or other magnetic storage device, or a CD-ROM; or any other medium on which it is known to store executable instructions.

Although the present invention has been described with reference to embodiments for processing requests for data from the Internet, persons skilled in the art will recognize that it is equally applicable to other networking environments. For example, embodiments of the present invention may be used to distribute dynamic content to users on an "intranet." An intranet typically is a secure corporate network modeled after the Internet architecture, and generally includes mechanisms for communicating with external networks such as the Internet.

The foregoing is a detailed description of particular embodiments of the present invention. The invention embraces all alternatives, modifications and variations that fall within the letter and spirit of the claims, as well as all equivalents of the claimed subject matter. For example, the foregoing embodiments need not be implemented in devices which communicate using HTTP. Persons skilled in the art will recognize from the foregoing detailed description that many other alternatives, modifications and variations are possible.

What is claimed is:

1. A method comprising:
    installing a dynamic executable module on a client device coupled to a network device, the dynamic executable module to retrieve dynamic content to be presented to a user and control presentation of the dynamic content;
    presenting the dynamic content at a time selected in accordance with a predetermined condition comprising existence of an open connection between the client device and the network device;
    estimating a time period over which the connection between the client device and the network device will remain open; and
    presenting the dynamic content for a time period equal to no more than the estimated time period.

2. The method of claim 1, wherein said presenting the dynamic content further comprises presenting the dynamic content while the connection between the client device and the network device remains open.

3. The method of claim 1, further comprising extending the time period for presenting the dynamic content in response to a user request.

4. The method of claim 1, further comprising the step of periodically monitoring the connection between the client device and the network device.

5. The method of claim 1, wherein the dynamic content comprises advertising information.

6. The method of claim 1, wherein the predetermined condition further comprises expiration of a predetermined time interval.

7. The method of claim 6, wherein said presenting the dynamic content further comprises presenting the dynamic content periodically.

8. A client device to present dynamic content to a user, said client device comprising a computer including:
a browser to present data to a user; and
a dynamic executable module to retrieve dynamic content and to control presentation of the dynamic content at a time selected in accordance with a predetermined condition including existence of an open connection between the client device and the network device;
said dynamic executable module to present the dynamic content for a time period equal to no more than an estimated time period for which the connection will remain open.

9. The client device of claim 8, wherein said dynamic executable module is integrated with said browser.

10. The client device of claim 8, wherein said dynamic executable module is to present the dynamic content while the connection between the client device and the network device remains open.

11. The client device of claim 8, wherein said dynamic executable module is further to calculate the estimated time period.

12. The client device of claim 8, wherein said dynamic executable module is to periodically monitor the connection between the client device and the network device.

13. The client device of claim 8, wherein the dynamic content comprises advertising information.

14. The client device of claim 8, wherein the predetermined condition further comprises expiration of a predetermined time interval.

15. The client device of claim 14, wherein said dynamic executable module is to present the dynamic content periodically.

16. A machine-readable medium having stored thereon a plurality of executable instructions to perform a method comprising:
retrieving dynamic content;
controlling presentation of the dynamic content at a time selected in accordance with a predetermined condition including existence of an open connection between a client device and a network device; and
presenting the dynamic content for a time period equal to no more than an estimated time period for which the connection will remain open.

17. The machine-readable medium of claim 6, wherein said machine-readable medium comprises a magnetic storage device.

18. The machine-readable medium of claim 16 wherein the method further comprises:
calculating the estimated time period.

19. The machine-readable medium of claim 16 wherein the method further comprises:
periodically monitoring the connection between the client device and the network device.

20. The machine-readable medium of claim 16 wherein the method further comprises:
periodically presenting the dynamic content.

21. The machine-readable medium of claim 16 wherein the method further comprises:
retrieving advertising information.

* * * * *